July 3, 1962 — E. N. TAYLOR — 3,042,019

SERVING TRAY FOR HORS D'OEUVRES AND THE LIKE

Filed Dec. 15, 1959

INVENTOR.
Eleanor N. Taylor,
BY Paul & Paul
ATTORNEYS.

3,042,019
SERVING TRAY FOR HORS D'OEUVRES AND THE LIKE
Eleanor N. Taylor, 430 Bondsville Road, Downingtown, Pa.
Filed Dec. 15, 1959, Ser. No. 859,790
1 Claim. (Cl. 126—43)

This invention relates to a serving tray for hors d'oeuvres and the like.

My invention has for its chief aim the provision of a tray for the above purpose having combined therewith individually removable receptacles for viands such as meat or sausage bits, cheese cuts etc., and grill means by which such viands can be heated in preparation for consumption with crackers or bread bits supported on the tray between the receptacles.

Other objects and attendant advantages will appear from the following detailed description of the attached drawings, wherein.

Figure 1:
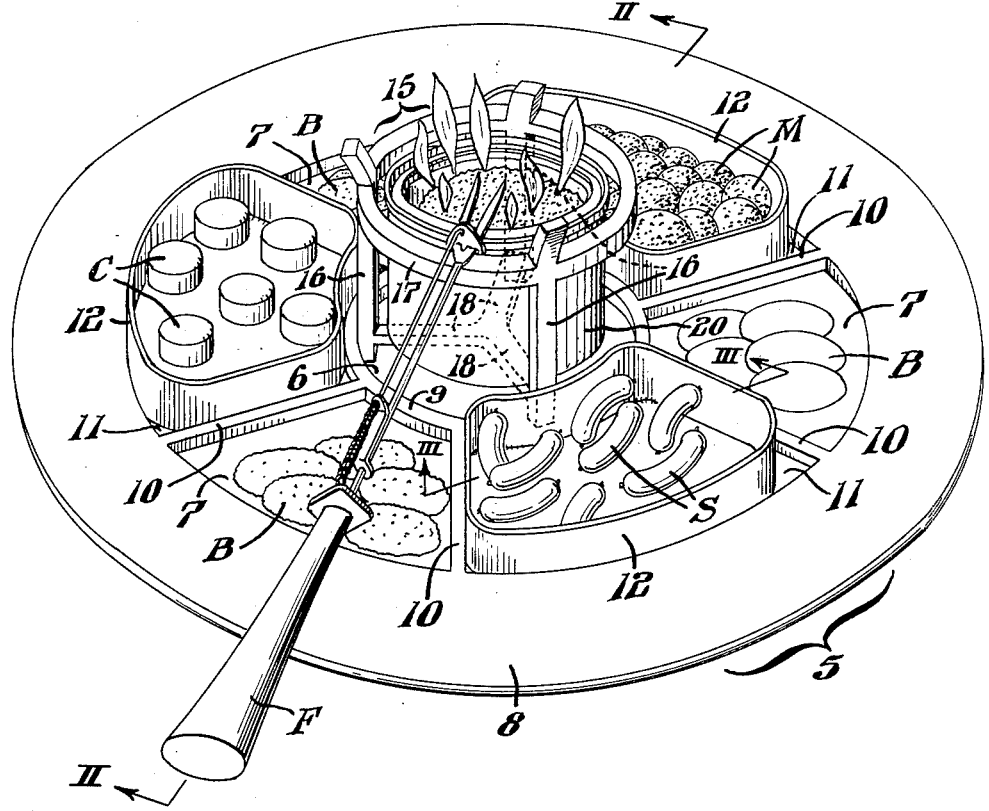
FIG. 1 is a perspective view of a combination serving tray and grill conveniently embodying my invention.
Figure 2:
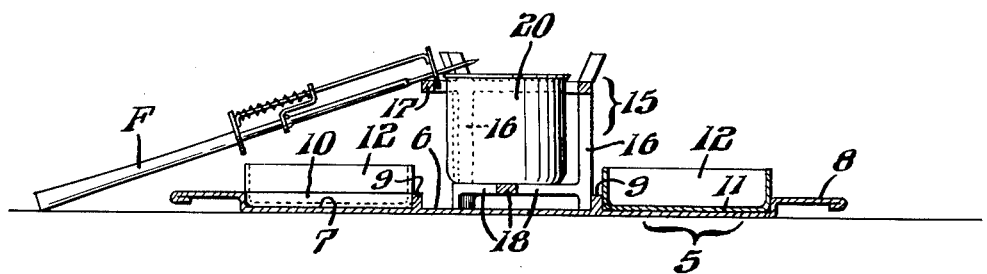
FIG. 2 is a sectional view taken as indicated by angled arrows II—II in FIG. 1.
Figure 3:
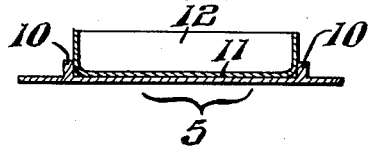
FIG. 3 is a fragmentary view in section taken as indicated III—III in FIG. 1.

As herein exemplified, the serving tray of my invention comprises a circular dish which is comprehensively designated 5 and which may be struck from sheet metal or molded from ceramic material or plastic. As shown, the dish 5 has a center recess 6 relatively small in area surrounded by a relatively wide depression or annular channel 7, and a relatively wide circumferential brim 8 at an elevation above the dish bottom, the center recess 6 being defined by an annular ridge 9 between it and the channel, and said channel being subdivided in this instance by a plurality of equally spaced partitions in the form of radial ridges 10. Fitting into the sector shaped pockets 11, defined by the ridge 9 and the ribs 10, are correspondingly configured receptacles 12 for meat bits M, sausage bits S, cheese bits C and the like. The pockets 7 intermediate those occupied by the receptacles 12 may be used for bread or crackers B.

Fitting into the center recess 6 of the dish 5 is an open grill stand 15 in the form of a tripod cast from metal (preferably iron) of which the legs 16 are joined near their tops by a ring or band 17 and at their bottoms by a radially armed spider 18, the legs extending upwardly beyond the ring as at 19. The tripod 15 is of a size to receive a cup or can 20 containing flammable material, with said cup or can resting on the spider 18 with its bottom elevated well above the dish bottom to prevent heat transfer to the latter.

In the use of the tray, the receptacles 12 are filled with viands as shown, and inserted into alternate pockets 11 of the dish 5, and the intervening pockets in the channel are filled with bread bits or crackers. With the tray so filled, the flammable material in the cup or tin 20 is ignited. Then, by means of a fork such as shown at F in FIG. 1, the user selects the desired tidbit from one of the receptacles 12 and holds it for a time over the flame of the grill until it is heated to the desired temperature for consumption, together with a cracker or bread taken from one of the other pockets of the dish.

While for convenience of illustration herein, I have shown the dish 5 as being circular in configuration, it may be otherwise configured, and the appended claims are therefore to be construed with this in mind.

While the preferred embodiment of this invention has been described in some detail, it will be obvious to one skilled in the art that various modifications may be made without departing from the invention as hereinafter claimed.

Having thus described my invention, I claim:

As a new product of manufacture, a combined serving tray and grill for hors d'oeuvres and the like, comprising an integrally formed dish having a circular center recess, a channel surrounding the recess and separated from the recess by a narrow circular rib, a flat brim surrounding the channel, and a plurality of narrow radial ribs subdividing the channel into a plurality of sector shaped pockets; a plurality of relatively shallow receptacles conformed to fit snugly into the pockets, whereby each receptacle is supported against movement by a pair of adjacent radial ribs, the circular rib, and that portion of the channel adjacent the brim; an open stand and a fuel cup supported therein, said stand having three legs in the form of a tripod and conformed to fit snugly into the central recess, whereby the bottom ends of said legs rest on the surface of said dish within the center recess and are firmly supported against lateral movement by the circular rib, the legs of the tripod being spaced to receive the fuel cup between them, said legs being joined at a level above their bottom ends by a spider supporting the cup at an elevation above the dish bottom, and said legs being joined adjacent their top ends by an annular band.

References Cited in the file of this patent

UNITED STATES PATENTS

| | | |
|---|---|---|
| 1,373,828 | Nottingham | Apr. 5, 1921 |
| 1,411,250 | Ball | Apr. 4, 1922 |
| 1,622,633 | Faiella | Mar. 29, 1927 |
| 2,042,637 | Scurlock | June 2, 1936 |
| 2,719,413 | Panzer | Oct. 4, 1955 |

FOREIGN PATENTS

| | | |
|---|---|---|
| 521,552 | Belgium | Aug. 14, 1953 |

OTHER REFERENCES

Model 3HD, "Barbecue Grill," appearing on page 3 of the Woodward and Lothrop 1959 Spring Housewares catalog, received in the Patent Office Mar. 16, 1959. (Copy available in Div. 19.)